United States Patent
Bremmer et al.

(10) Patent No.: US 9,114,586 B2
(45) Date of Patent: Aug. 25, 2015

(54) LATTICE GRID CAUL FOR HONEYCOMB COMPOSITE STRUCTURE

(75) Inventors: Jonathan Bremmer, Glastonbury, CT (US); Paul H. Denavit, Woodbridge, CT (US); Edward Joseph Fabian, Oxford, CT (US); Jeffrey G. Sauer, Woodbury, CT (US); William E. Hovan, III, Oxford, CT (US); Darryl Mark Toni, Madison, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 574 days.

(21) Appl. No.: 13/369,921

(22) Filed: Feb. 9, 2012

(65) Prior Publication Data

US 2013/0344295 A1    Dec. 26, 2013

(51) Int. Cl.
*B28B 7/00* (2006.01)
*B29C 33/00* (2006.01)
*B32B 3/12* (2006.01)
*B32B 7/02* (2006.01)

(52) U.S. Cl.
CPC .............. *B32B 7/02* (2013.01); *Y10T 156/10* (2015.01); *Y10T 428/24628* (2015.01); *Y10T 428/24983* (2015.01)

(58) Field of Classification Search
None
See application file for complete search history.

(56) References Cited

U.S. PATENT DOCUMENTS

| | | | | |
|---|---|---|---|---|
| 3,681,165 | A  * | 8/1972 | Carmellini et al. | ........... 156/297 |
| 5,645,670 | A | 7/1997 | Reinfelder et al. | |
| 6,197,146 | B1 | 3/2001 | Sucic et al. | |
| 6,814,563 | B2 * | 11/2004 | Amnered et al. | ............. 425/389 |
| 7,534,387 | B2 | 5/2009 | Zenkner et al. | |

* cited by examiner

*Primary Examiner* — David Sample
*Assistant Examiner* — Nicole T Gugliotta
(74) *Attorney, Agent, or Firm* — Cantor Colburn LLP

(57) ABSTRACT

A caul system for a composite structure having one or more core elements includes a lattice grid hard caul selectively locatable at a portion of the composite structure without core elements. The caul system further includes a soft caul selectively locatable at a portion of the composite structure having a core element. A method of forming a composite structure with one or more core elements includes locating a first laminate in a tool and locating one or more core elements over the first laminate. A second laminate is located over the one or more core elements. A lattice grid hard caul is placed over the second laminate, avoiding locations having core elements of the one or more core elements disposed thereat. A soft caul is located over the one or more core elements, thereby preventing deformation of the one or more core elements.

5 Claims, 2 Drawing Sheets

LATTICE GRID CAUL FOR HONEYCOMB COMPOSITE STRUCTURE

FEDERAL RESEARCH STATEMENT

This invention was made with Government support under N00019-06-C-0081 awarded by the Department of the Navy. The Government has certain rights in this invention.

BACKGROUND OF THE INVENTION

The subject matter disclosed herein relates to honeycomb core composite structures. More specifically, the subject disclosure relates to a caul plate system for honeycomb core composite structures.

Honeycomb composite structures are typically fabricated having one or more laminate structures formed from a selected number of plies, and one or more core elements, which are often honeycomb core elements. The core elements are bonded to the laminate structures under a cure cycle involving pressure and/or high temperature applied to the composite. To achieve finished structures that adhere to tight dimensional tolerancing, especially in areas where there is no honeycomb core, a cure process using a closed tool is typically used. The process uses tools on an outer mold line and an inner mold line of the structure which effectively sandwich the entire composite structure. Inner mold line tooling is costly, and does not allow for compliance, or dimensional variation in the honeycomb core areas of the structure.

BRIEF DESCRIPTION OF THE INVENTION

According to one aspect of the invention, a caul system for a composite structure having one or more core elements includes a lattice grid hard caul selectively locatable at a portion of the composite structure without core elements. The caul system further includes a soft caul selectively locatable at a portion of the composite structure having a core element.

According to another aspect of the invention, a method of forming a composite structure with one or more core elements includes locating a first laminate in a tool and locating one or more core elements over the first laminate. A second laminate is located over the one or more core elements. A lattice grid hard caul is placed over the second laminate, avoiding locations having core elements of the one or more core elements disposed thereat. A soft caul is located over the one or more core elements, thereby preventing deformation of the one or more core elements.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
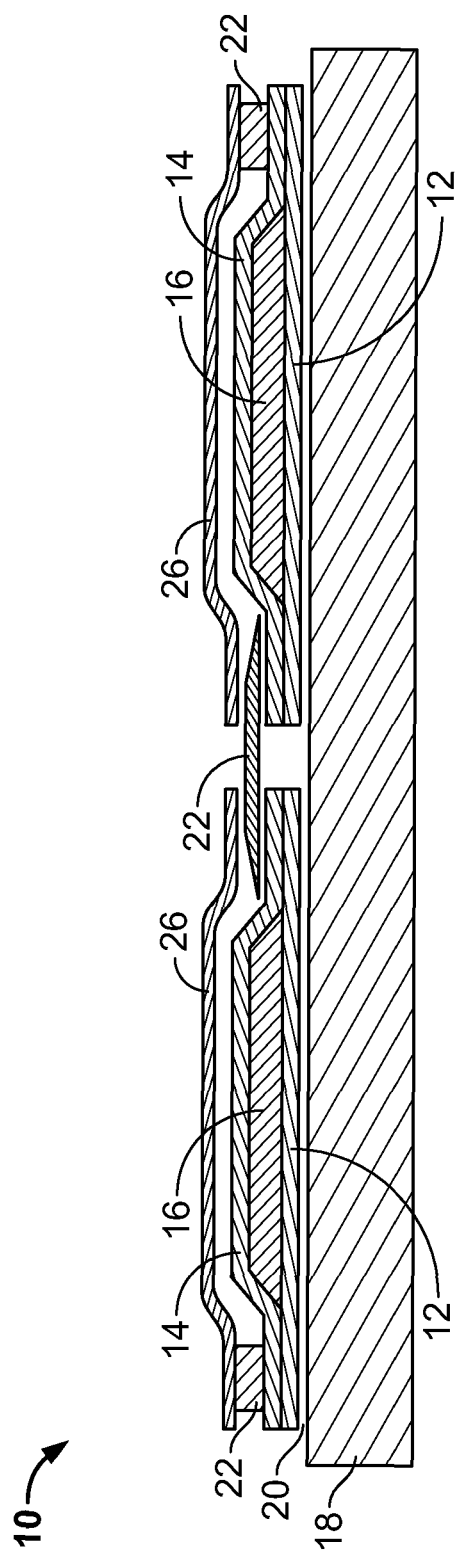
FIG. 1 is a cross-sectional view of an embodiment of a caul system for a composite structure.

Shown in FIG. 1 is an embodiment of a composite structure 10. The composite structure 10 includes a first laminate 12 and a second laminate 14, with one or more core elements, for example, honeycomb core elements 16 located between the first laminate 12 and the second laminate 14.

Figure 2:
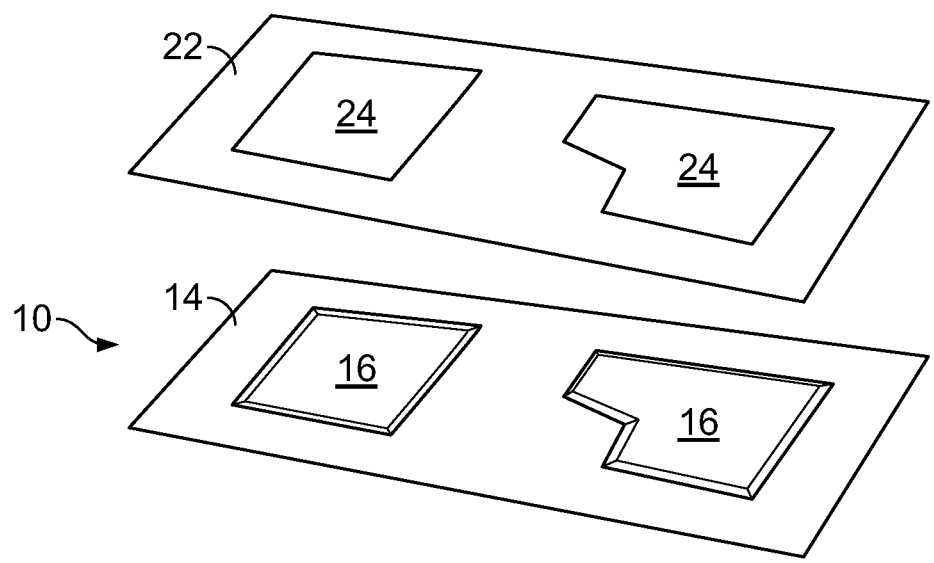
FIG. 2 is a perspective view of an embodiment of a caul system for a composite structure.

For cure of the composite structure 10, the first laminate 12 is located in a tool 18, which in some embodiments substantially conforms to an outer mold line 20 of the composite structure 10. The honeycomb core elements 16 and the second laminate 14 are then located in the tool 18 over the first laminate 12. To dimensionally control selected areas, such as where the first laminate 12 bonds directly to the second laminate 14, a lattice caul 22 is placed over portions of the second laminate 14 where such dimensional control is desired. As shown in FIG. 2, the lattice caul 22 includes a plurality of interconnected elements defining a plurality of openings 24 to avoid resting on areas of the composite structure 10 that include honeycomb core elements 16. The lattice caul 22 is a so-called hard caul formed of a hard material such as metal, composite, or high durometer rubber, for example, a durometer of about 70 Shore D or higher. The lattice caul 22 provides the dimensional control of a closed tool configuration in the selected areas, while still allowing for compliance in the honeycomb core element 16 areas of the composite structure 10.

Figure 3:
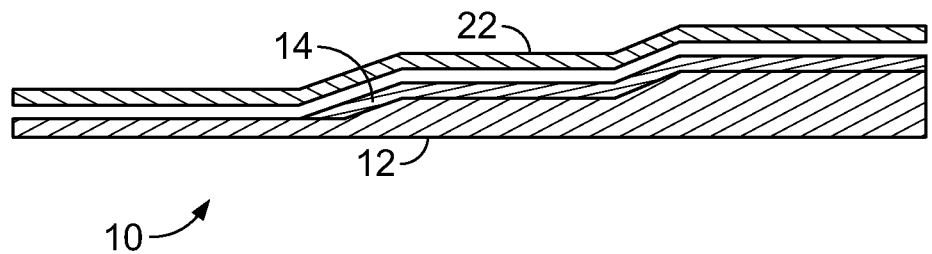
FIG. 3 is a cross-sectional view of another embodiment of a caul system for a composite structure.

Referring to FIG. 3, in some embodiments, the lattice caul 22 is stepped or contoured to accommodate changes in thickness in the composite structure. Referring again to FIG. 1, areas of the composite structure 10 including honeycomb core elements 16 are covered in a soft rubber caul 26, having a lower durometer than the lattice caul 22. For the soft rubber caul 26, the material should be soft enough not to bridge over contours or changes in thickness of the composite structure 10, but hard enough to not allow a dimpling effect over the core elements 16. In some embodiments, the soft caul may have a durometer between about 50 and about 70 Shore D. In some embodiments, the soft rubber caul 26 extends over at least a portion of the lattice caul 22. The assembly structure is then cured by applying pressure and/or heat to form a unitary structure 10 including the first laminate 12, the second laminate 14 and the honeycomb core elements 16. This allows for normal processing over the honeycomb core element areas 16 while resulting in a close-toleranced composite structure 10 in the select areas covered by the lattice caul 22.

The caul system described herein allows for higher pressure processing to prevent honeycomb core element 16 distortion, stabilizes the honeycomb core elements 16 and the first and second laminates 12, 14, with less post cure finishing requirements prior to the next assembly level due to the increased dimensional accuracy of the selected areas.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A caul system for a composite structure having one or more core elements comprising:
   a lattice grid hard caul selectively locatable at a portion of the composite structure without core elements; and
a soft caul selectively locatable at a portion of the composite structure having a core element;
   wherein the lattice grid caul includes one or more contours to accommodate changes in thickness of the composite structure.

2. The caul system of claim 1, wherein the soft caul is formed of a rubber material.

3. The caul system of claim 1, wherein the composite structure has a first lamination covering a first side of the core element and a second lamination covering a second side of the core element; and
   at least a portion of the lattice grid hard caul is positioned at an overlap of the first lamination and the second lamination.

4. The caul system of claim 1, wherein the lattice grid hard caul comprises a plurality of interconnected elements defining one or more openings for one or more core elements of the composite structure.

5. The caul system of claim 1, wherein the lattice grid hard caul is formed from one of a metal, composite or high durometer rubber.

* * * * *